(12) United States Patent
Beutin et al.

(10) Patent No.: US 8,534,077 B2
(45) Date of Patent: Sep. 17, 2013

(54) TURBINE ENGINE WITH A POWER TURBINE EQUIPPED WITH AN ELECTRIC POWER GENERATOR

(75) Inventors: Bruno Albert Beutin, Evry (FR); Antoine Olivier Francois Colin, Brunoy (FR); Clarisse Savine Mathilde Reaux, Saint Martin de Bossenay (FR); Didier Jean-Louis Yvon, Savingy sur Orge (FR)

(73) Assignee: Snecma, Paris (FR)

( * ) Notice: Subject to any disclaimer, the term of this patent is extended or adjusted under 35 U.S.C. 154(b) by 881 days.

(21) Appl. No.: 12/648,701

(22) Filed: Dec. 29, 2009

(65) Prior Publication Data

US 2011/0167835 A1 Jul. 14, 2011

(30) Foreign Application Priority Data

Jan. 23, 2009 (FR) ...................................... 09 50408

(51) Int. Cl.
*F02C 7/32* (2006.01)
*F02K 3/00* (2006.01)

(52) U.S. Cl.
USPC ................ 60/802; 60/226.1; 60/268; 290/52; 416/170 R

(58) Field of Classification Search
USPC ............ 60/39.162, 226.1, 268, 802; 244/69; 290/1 C, 43, 52; 310/67 R; 415/122.1; 416/170 R
See application file for complete search history.

(56) References Cited

U.S. PATENT DOCUMENTS

| 3,483,696 | A | * | 12/1969 | Gilbert et al. | 60/792 |
|---|---|---|---|---|---|
| 3,585,398 | A | * | 6/1971 | Harvey | 290/52 |
| 3,586,867 | A | * | 6/1971 | Maillet | 290/52 |
| 3,678,690 | A | * | 7/1972 | Shohet et al. | 60/226.3 |
| 3,918,389 | A | * | 11/1975 | Shima | 440/38 |
| 4,117,343 | A | * | 9/1978 | Hoffeins | 290/52 |
| 4,222,700 | A | * | 9/1980 | Leuthard | 415/7 |
| 4,771,197 | A | * | 9/1988 | Ivanto et al. | 310/67 R |
| 4,936,748 | A | * | 6/1990 | Adamson et al. | 416/123 |
| 5,687,561 | A | * | 11/1997 | Newton | 60/226.1 |
| 5,724,816 | A | * | 3/1998 | Ritter et al. | 60/752 |
| 7,246,482 | B2 | * | 7/2007 | Mahoney et al. | 60/204 |

FOREIGN PATENT DOCUMENTS

| FR | 1.358.266 | 4/1964 |
|---|---|---|
| GB | 2 225 297 A | 5/1990 |

OTHER PUBLICATIONS

U.S. Appl. No. 12/648,696, filed Dec. 29, 2009, Beutin, et al.

* cited by examiner

*Primary Examiner* — Ted Kim
*Assistant Examiner* — Michael B Mantyla
(74) *Attorney, Agent, or Firm* — Oblon, Spivak, McClelland, Maier & Neustadt, L.L.P.

(57) ABSTRACT

A turbine engine for aircraft includes a gas generator as well as to a receiver driven by a power turbine, and to an electric power generator, the rotor of which centered on a rotor axis distinct from the longitudinal axis, is driven into rotation by the power turbine, via a mechanical gear transmission, including a toothed drive wheel centered on the axis. Further the receiver includes a first propeller driven by a free power turbine and the toothed drive wheel is attached on an outer case of this power turbine.

11 Claims, 2 Drawing Sheets

TURBINE ENGINE WITH A POWER TURBINE EQUIPPED WITH AN ELECTRIC POWER GENERATOR

TECHNICAL FIELD

The present invention generally relates to the field of aircraft turbine engines with an electric power generator.

The invention relates to any kind of turbine engine, the receiver of which is driven by one or more either free or attached power turbines.

STATE OF THE PRIOR ART

From the prior art it is known how to implement an electric generator on a turbine engine, with the purpose of electrically powering equipment with the produced power. These known pieces of equipment may be electrical pieces of equipment of a turbine engine and/or of the aircraft.

Usually, the mechanical power required for setting the rotor of the electric generator into rotation is picked up on the high pressure body, and more specifically on a radial shaft of the high pressure compressor.

Nevertheless, as the needs in electric power are becoming increasingly consequent, in particular owing to the electrification of aircrafts and of their turbine engines, the mechanical power to be picked up on the high pressure compressor may become critical, because it is too large. Indeed, excessive mechanical power picked up on the high pressure compressor may affect the operability of the turbine engine, the pumping margins may no longer be satisfactory under certain flight conditions, notably in the idling phases of the turbine engine. Moreover this drawback is still greater when the compressor has a small diameter, which in particular is the case on so-called "open rotor" (non-faired rotor) turbine engines.

SUMMARY OF THE INVENTION

The object of the invention is therefore to find at least a partial remedy to the drawback mentioned above, relating to the achievements of the prior art.

To do this, the object of the invention is a turbine engine for an aircraft comprising a gas generator as well as a receiver driven by a power turbine. It further comprises an electric power generator, the rotor of which, centred on a rotor axis distinct from the longitudinal axis of the turbine engine, is driven into rotation by said power turbine via a mechanical gear transmission comprising a toothed drive wheel centred on the longitudinal axis of the turbine engine.

Further, said receiver comprises a first propeller driven by a first free power turbine, and said toothed drive wheel is attached on an outer case of said first power turbine.

Thus, the invention is remarkable in that the picking up of mechanical power is carried out on the power turbine driving the receiver and fed with gas by the gas generator. This entirely eradicates the risk of thermodynamic disequilibrium likely to be produced within the gas generator, notably because of the fact that the free nature of the power turbine makes it mechanically independent of the gas generator. Actually, an increase in the total power available on the receiver, corresponding to the power dedicated to the electric generator and to the power dedicated to the thrust, simply causes a global increase in the temperature and pressure characteristics required for the gas generator. In particular, the pumping margins remain satisfactory under all flight conditions, even in the case when the gas generator comprises components of small diameters, such as this is the case on so-called "open rotor" turbine engines forming a preferential application of the present invention.

Further, this particular implementation of the electric generator makes the latter easily accessible for operators carrying out handling operations.

Preferably, said toothed drive wheel cooperates with a toothed portion provided on a rotor extension centred on the rotor axis.

Preferably, said first propeller has a propeller case from which blades protrude radially outwards, and the propeller case is found in the aerodynamic continuity of an outer nacelle skin or said turbo machine, as this is usually the case on <<open rotor>> turbine engines.

Said electric power generator may preferentially be of the type with radial flow, but may alternatively be of the type with axial flow, without departing from the scope of the invention.

Preferably, said receiver comprises a second propeller driven by a second free or attached power turbine, the first and second propellers being counter-rotating. Alternatively, both propellers may be driven in the same direction of rotation, without departing from the scope of the invention.

Preferably, each of the first and second propellers is driven by its associated power turbine, directly or via a reduction gear, or any other mechanical transmission system.

Preferably, said gas generator is with a dual body, and comprises a high pressure compressor equipped with a radial shaft driving the rotor of an additional electric power generator. Therefore, the required electric power is advantageously produced by at least two distinct generators, thereby limiting the total power which each of them has to provide. In particular, the additional generator preferably only produces a portion of the required electric power, so that its implementation does not affect the operability of the turbine engine. Its size may therefore be reduced with respect to that of the generators of the prior art provided in the same location.

Finally, said receiver is preferably located downstream from the gas generator, therefore at the rear of the turbine engine, as this is generally encountered on "open rotor" turbine engines.

Other advantages and features of the invention will become apparent in the non-limiting detailed description below.

BRIEF DESCRIPTION OF THE DRAWINGS

This description will be made with reference to the appended drawings wherein.

DETAILED DESCRIPTION OF PREFERRED EMBODIMENTS

Figure 1:
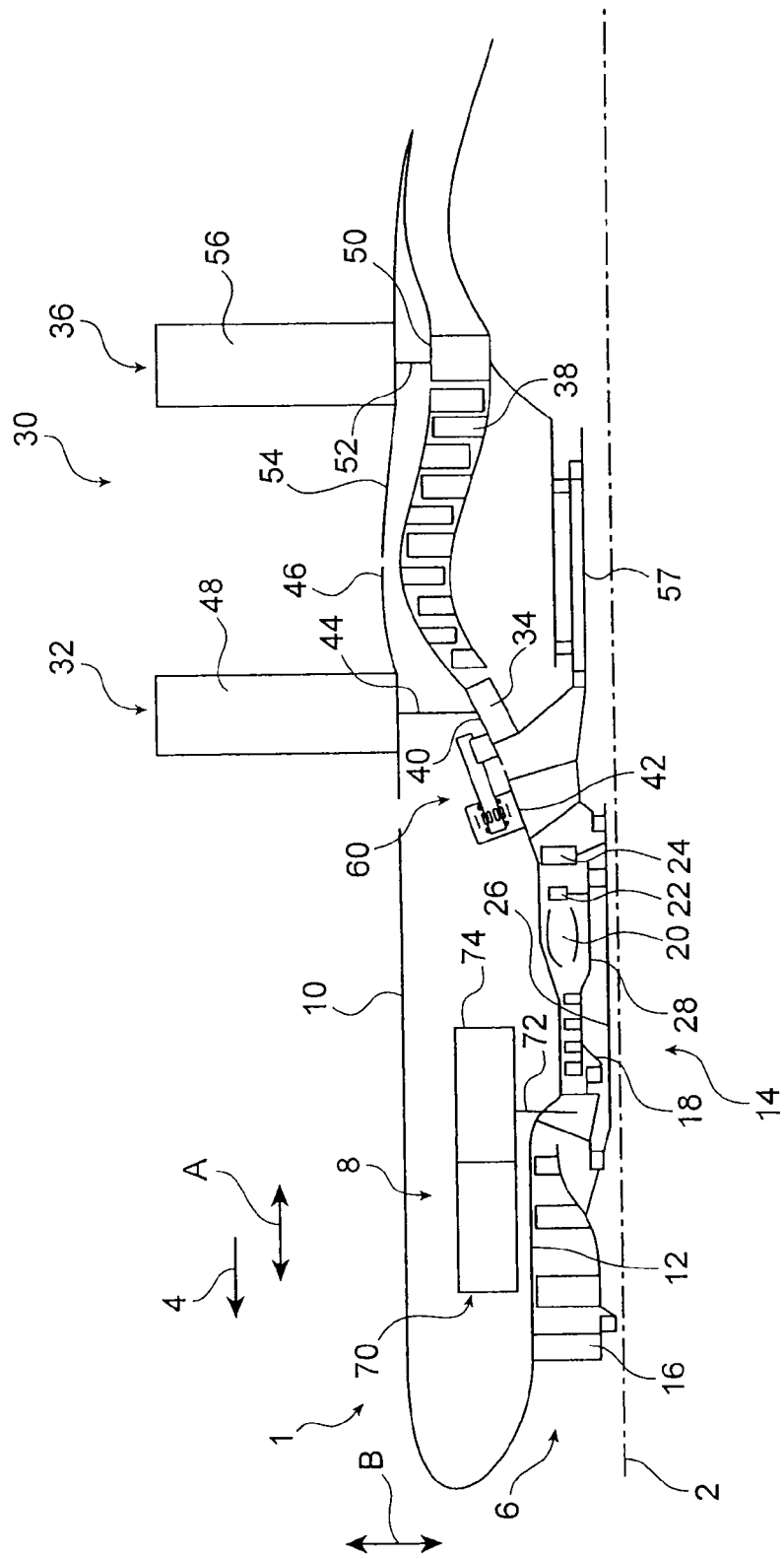
FIG. 1 illustrates a schematic view of a longitudinal half-section of a turbine engine for an aircraft, according to a preferred embodiment of the present invention.

With reference to FIG. 1, a turbine engine 1 of the "open rotor" type may be seen, according to a preferred embodiment of the present invention.

In the figures, the direction A corresponds to the longitudinal direction or axial direction, parallel to the longitudinal axis 2 of the turbine engine. The direction B, as for it, corresponds to the radial direction of the turbine engine. Further, the arrow 4 schematizes the forward movement direction of the aircraft under the action of the thrust of the turbine engine 1, this forward movement direction being opposite to the main gas flow direction within the turbine engine. The terms "front", "upstream", "rear", "downstream" used in the following description should be considered relatively to said forward movement direction 4.

In the front portion, the turbine engine has an air intake 6 continuing rearwards through a nacelle 8, the latter globally including an outer skin 10 and an inner skin 12, both of them centred on the axis 2 and radially shifted from each other.

The inner skin 12 forms an external radial case for a gas generator 14, comprising in a standard way, from the front towards the rear, a low pressure compressor 16, a high pressure compressor 18, a combustion chamber 20, a high pressure turbine 22 and an intermediate pressure turbine 24. The compressor 16 and the turbine 24 are mechanically connected through a shaft 26, thus forming a low pressure body, while the compressor 18 and the turbine 22 are mechanically connected through a shaft 28, thereby forming a higher pressure body. Therefore, the gas generator 14 preferably has a standard design, a so-called dual body design.

Downstream from the intermediate pressure turbine 24 is found a receiver 30 driven by a free power turbine. More specifically, in the preferred described embodiment, the receiver comprises two counter-rotating propellers, the first propeller 32, the most upstream, interdependently rotating with a first free power turbine 34, and the second propeller 36 interdependently rotating with a second free power turbine 38. If the solution of direct coupling has been retained between the free turbines and their respective propellers, a so-called "direct drive" design, an alternative solution in which a reduction gear would be interposed between each free turbine and its associated propeller, may be contemplated, without departing from the scope of the invention. Also, a solution with a single propeller may also be contemplated.

Still referring to FIG. 1, it may be seen that the first power turbine 34, positioned downstream from the intermediate pressure turbine 24, has an outer case 40 which is located in the rear extension of a fixed outer case 42, itself laid out in the rear extension of the outer radial case 12 of the gas generator 14. Moreover, the cases 12 and 42 may be made in a single piece.

A flange or a plurality of arms 44 allows the propeller 32 to be offset radially outwards, the flange 44 having an internal radial end integral with the outer turbine case 40, and an external radial end integral with an outer propeller case 46. The blades 48 protrude radially outwards from this case 46, one of the particularities of which is that it is found in the rear aerodynamic continuity of the outer nacelle skin 10.

Moreover, the second power turbine 38, also positioned downstream from the intermediate pressure turbine 24, has an outer case 50 which is located in the rear extension of the outer case 40 of the first turbine. In the illustrated preferred embodiment, both turbines are in fact nested in each other, the stages of the first turbine being alternately laid out with the stages of the second turbine in the A direction. Thus, the inner cases of both free turbines 34, 38 are also found in the extension of each other.

A flange or a plurality or arms 52 allows the propeller 36 to be offset radially outwards, the flange 52 having an internal radial end integral with the outer turbine case 50, and an external radial end integral with an outer propeller case 54. The blades 56 protrude radially outwards from this case 54, which is found in the rear aerodynamic continuity of the outer case 46 of the first propeller 32. This configuration is typical of an "open rotor" turbine engine.

As an indication, it is recalled that free turbines 34, 38 do not have any direct mechanical link with rotating components of the gas generator, i.e. they neither drive the elements 16, 18, 22, 24 nor are driven by them. Therefore, only the gases escaping from the intermediate pressure turbine 24 ensure the setting of these free turbines 34, 38 into rotation, rotatably mounted on a fixed shaft 57 of the turbine engine.

Figure 2:
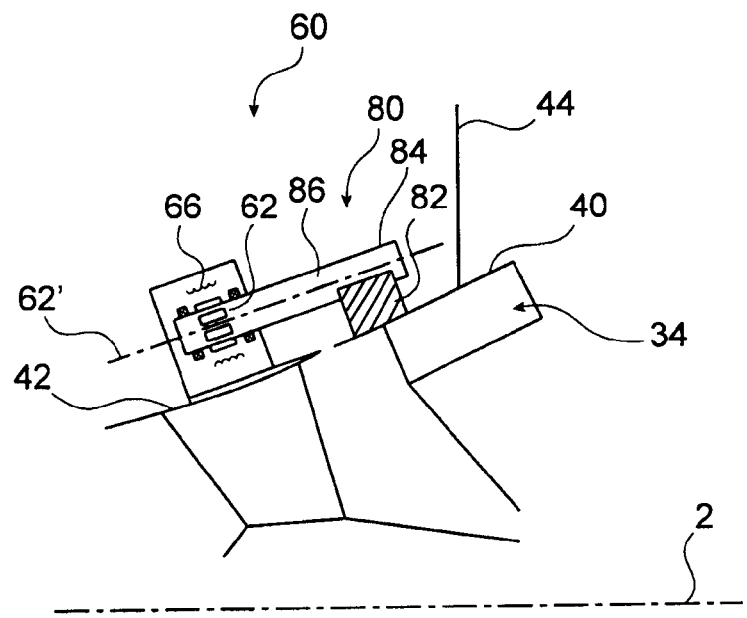
FIG. 2 illustrates an enlarged schematic view of the electric power generator, with which the turbine engine shown in FIG. 1 is equipped.

One of the particularities of the present invention lies in the implementation of an electric power generator 60, the mechanical energy of which is drawn at the free power turbine 34, as this will now be described with reference to FIG. 2.

In this preferred embodiment, the rotor 62 of the generator assumes the shape of a shaft extending along a rotor axis 62' distinct from the axis 2, preferably tilted relatively to the latter. The stator of the generator, into which the rotor 62 penetrates, is fixedly laid out on a rear end of the outer case 42, radially outwards relatively to the latter. In this preferred embodiment, the rotor 62 and stator 66, coaxial with and centred on the axis 62', are radially shifted from each other, thereby forming an electric power generator with radial flow. Of course, any design known from one skilled in the art may be used for making this generator with radial flow.

The rotor of shaft 62, laid out radially outwards relatively to the cases 40, 42, is driven into rotation around its axis 62' by the first free turbine 34. To do this, a transmission system 80 with gears is used, which first of all comprises a toothed drive wheel 82, centred on the longitudinal axis 2 and attached on the outer case 40, the teeth protruding radially outwards relatively to the latter. This wheel 82 therefore extends over 360° around the free turbine 34. It cooperates with a toothed portion 84 provided on a rotor extension 86 centred on the rotor axis 62'. Preferably, a single shaft with an axis 62' forms the rotor 62 and the extension 86 integrating the toothed portion 84, as this was schematized in FIG. 2.

Thus, when the free turbine 34 is set into motion, it drives into rotation with it the toothed wheel 82 around the axis 2, which as for it drives the rotor 62 into rotation around its axis 62'. The generator 60 is provided for electrically powering electric equipment of the turbine engine and/or aircraft, this equipment being known to one skilled in the art. The advantage related to the particular location of this generator 60 lies in its very easy access for handling operations, and in the non-perturbation of the thermodynamic equilibrium of the gas generator 14. As such, provision may nevertheless be made, as this known from the prior art, for an additional electric power generator 70, the rotor (not shown) of which is driven into rotation by a radial shaft 72 integral with the high pressure compressor 18, directly or via a gear box of reduction gear 74. Thus, the required electric power may be picked up at either one or both of the two generators 60, 70.

Finally, it is noted that one or more other electric power generators may be implemented on the turbine engine, for example at the second free turbine 38.

Figure 3:
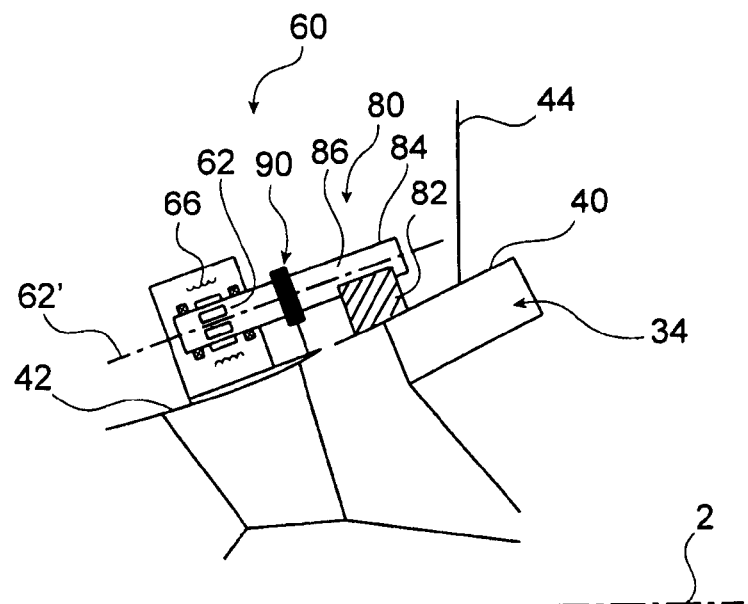
FIG. 3 illustrates a similar view to that of the FIG. 2, the turbine engine appearing as an alternative embodiment.

Referring now to FIG. 3, an alternative embodiment may be seen on which a mechanical uncoupling system 90 is interposed between the rotor 62 and the outer case 42, constituting a fixed element of the turbine engine. The mechanical uncoupling system 90 allows the electric generator to be dissociated from its drive. Thus, in the case of a problem occurring at the electric generator, for example overheating or clamping between the rotor and the stator, with the system 90 it is possible to no longer drive the generator. With this system, it is also possible to provide flexibility to the connection between the drive and the generator.

Of course, various modifications may be made by one skilled in the art to the invention which has just been described, only as non-limiting examples.

The invention claimed is:

1. A turbine engine for aircraft, said turbine engine having a longitudinal axis and comprising:
   a gas generator,
   a power turbine,
   a receiver driven by said power turbine, and
   an electric power generator having a rotor centered on a rotor axis distinct from the longitudinal axis of the turbine engine, wherein said rotor is set into rotation by said power turbine, via a mechanical transmission with gears, comprising a toothed drive wheel centered on the longitudinal axis of the turbine engine,
   wherein said receiver comprises a first propeller driven by a first free power turbine, and
   wherein said toothed drive wheel is attached on an outer case of said first free power turbine.

2. The turbine engine according to claim 1, wherein said toothed drive wheel cooperates with a toothed portion provided on a rotor extension centered on the rotor axis.

3. The turbine engine according to claim 1, wherein said first propeller has a propeller case from which blades protrude radially outwards, and wherein said propeller case is found in the aerodynamic continuity of an outer nacelle skin of said turbine engine.

4. The turbine engine according to claim 1, wherein said rotor of said electric power generator is coaxial or radially shifted relative to a stator of said electric power generator.

5. The turbine engine according to claim 1, wherein said receiver comprises a second propeller driven by a second free power turbine, the first and second propellers being counter-rotating.

6. The turbine engine according to claim 5, wherein each of the first and second propellers is driven by its associated power turbine, directly or via a reduction gear.

7. The turbine engine according to claim 1, wherein said gas generator includes a low pressure body and a high pressure body.

8. The turbine engine according to claim 7, wherein the gas generator comprises a high pressure compressor equipped with a radial shaft driving the rotor of an additional electric power generator.

9. The turbine engine according to claim 1, wherein said rotor of the electric generator is equipped with a mechanical uncoupling system.

10. The turbine engine according to claim 1, wherein said first free power turbine is configured to set into rotation said rotor of said electric power generator, wherein said first free power turbine does not have any direct mechanical link with rotating components of said gas generator such that only gases escaping from a pressure turbine set said first free power turbine into rotation.

11. The turbine engine according to claim 10, wherein said rotor axis of said rotor of said electric power generator is tilted relative to said longitudinal axis of said turbine engine.

* * * * *

UNITED STATES PATENT AND TRADEMARK OFFICE
CERTIFICATE OF CORRECTION

PATENT NO. : 8,534,077 B2  
APPLICATION NO. : 12/648701  
DATED : September 17, 2013  
INVENTOR(S) : Bruno Albert Beutin et al.

Page 1 of 1

It is certified that error appears in the above-identified patent and that said Letters Patent is hereby corrected as shown below:

On the Title Page  
Item (75), 4th Inventor, change "Savingy sur Orge" to --Savigny sur Orge--;

In the Specification  
Column 4, line 15, change "The stator of" to --The stator 66 of--.

Signed and Sealed this  
Tenth Day of December, 2013

Margaret A. Focarino  
*Commissioner for Patents of the United States Patent and Trademark Office*